(12) United States Patent
Dooley et al.

(10) Patent No.: US 10,754,956 B2
(45) Date of Patent: Aug. 25, 2020

(54) SECURITY STACK FOR EMBEDDED SYSTEMS

(71) Applicants: James Dooley, Colchester (GB); Jory Schwach, New York, NY (US)

(72) Inventors: James Dooley, Colchester (GB); Jory Schwach, New York, NY (US)

(73) Assignee: Andium Inc., New York, NY (US)

( * ) Notice: Subject to any disclaimer, the term of this patent is extended or adjusted under 35 U.S.C. 154(b) by 114 days.

(21) Appl. No.: 15/777,073

(22) PCT Filed: Nov. 17, 2016

(86) PCT No.: PCT/US2016/062449
§ 371 (c)(1),
(2) Date: May 17, 2018

(87) PCT Pub. No.: WO2017/087621
PCT Pub. Date: May 26, 2017

(65) Prior Publication Data
US 2018/0336352 A1   Nov. 22, 2018

Related U.S. Application Data

(60) Provisional application No. 62/256,454, filed on Nov. 17, 2015.

(51) Int. Cl.
*G06F 21/57* (2013.01)
(52) U.S. Cl.
CPC .................................. *G06F 21/575* (2013.01)

(58) Field of Classification Search
CPC .................................................. G06F 21/575
See application file for complete search history.

(56) References Cited

U.S. PATENT DOCUMENTS

| | | |
|---|---|---|
| 7,401,234 B2 | 7/2008 | Case et al. |
| 7,600,105 B2 | 10/2009 | Tseng |
| 8,006,095 B2 | 8/2011 | Berenbaum et al. |
| 8,254,568 B2 | 8/2012 | Smith et al. |
| 9,613,215 B2 * | 4/2017 | Cox ........................ G06F 21/575 |
| 9,916,452 B2 * | 3/2018 | Domke ................. H04L 9/0869 |
| 2013/0124843 A1 * | 5/2013 | Bobzin .................. G06F 21/575 713/2 |
| 2014/0010371 A1 * | 1/2014 | Khazan .................. G06F 21/602 380/278 |
| 2014/0122901 A1 * | 5/2014 | Bilke ........................ G06F 21/60 713/193 |
| 2015/0018104 A1 | 1/2015 | Hollander et al. |
| 2017/0364685 A1 * | 12/2017 | Shah ........................ G06F 21/53 |

* cited by examiner

*Primary Examiner* — Glenn A. Auve
(74) *Attorney, Agent, or Firm* — Dykema Gossett PLLC

(57) ABSTRACT

A method for executing a security stack can include executing a bootloader included in a memory resource of an electronic device in response to the bootloader receiving a prompt. The method can include performing a verification function, with the bootloader, on data stored in a programmable memory included in the memory resource of the electronic device, wherein the verification function includes comparing security data stored in a configuration area of the memory resource with a signature that accompanies the data stored in the programmable memory. The method can include determining whether the security data stored in the configuration area matches the signature that accompanies the data stored in the programmable memory.

20 Claims, 4 Drawing Sheets

SECURITY STACK FOR EMBEDDED SYSTEMS

CROSS-REFERENCE TO RELATED APPLICATION

This application claims priority to U.S. provisional patent application No. 62/256,454, filed on 17 Nov. 2016, which is hereby incorporated by reference as though fully set forth herein.

BACKGROUND

Modern microcontroller (MCU) architectures can be (re) programmed with instructions (e.g. firmware, operating system, application, etc.) that are stored in a computer-readable medium (e.g. flash memory) and subsequently executed every time the MCU restarts. Such devices can also be equipped with communications interfaces that allow the device to receive messages containing new instructions, configuration settings and other data.

SUMMARY

Various embodiments of the present disclosure can include a system. The system can include a memory resource and processor resource, the memory resource can comprise a bootloader, a configuration area, and a programmable memory, the memory resource can store computer-readable instructions, that when executed by the processor resource, cause the processor resource to execute the bootloader, in response to the bootloader receiving a prompt. The computer-readable instructions can be executed to perform a verification function, with the bootloader, on data stored in the programmable memory, wherein the verification function compares security data stored in the configuration area with a signature that accompanies the data stored in the programmable memory.

Various embodiments of the present disclosure can include a method for executing a security stack. The method can include executing a bootloader included in a memory resource of an electronic device in response to the bootloader receiving a prompt. The method can include performing a verification function, with the bootloader, on data stored in a programmable memory included in the memory resource of the electronic device, wherein the verification function includes comparing security data stored in a configuration area of the memory resource with a signature that accompanies the data stored in the programmable memory. The method can include determining whether the security data stored in the configuration area matches the signature that accompanies the data stored in the programmable memory.

Various embodiments of the present disclosure can include a non-transitory computer-readable medium storing instructions to execute a security stack, executable by a processing resource to execute a bootloader included in a memory resource of an electronic device in response to the bootloader receiving a prompt. The instructions can be executed to perform a verification function, with the bootloader, on data stored in a programmable memory included in the memory resource of the electronic device, wherein the verification function compares security data stored in a configuration area of the memory resource with a signature that accompanies the data stored in the programmable memory. The instructions can be executed to determine that the security data stored in the configuration area matches the signature that accompanies the data stored in the programmable memory. The instructions can be executed to execute the data stored in the configuration area in response to the determination.

DETAILED DESCRIPTION

Embodiments of the present disclosure are described below with reference to the accompanying figures. The features and advantages which are explained are illustrated by way of example and not by way of limitation. One of ordinary skill in the art will recognize that there are additional features and advantages provided by embodiments of the present disclosure beyond those described herein.

Typically, instructions can be installed on an MCU using a programmer that does not make any security checks. Further, a typical MCU may not make any security checks to decide if instructions should be executed, or if new data received should be acted upon. As individual devices are increasingly becoming part of larger interconnected applications, this introduces a serious security flaw and vector for attack. Thus, the need exists for a robust security stack that addresses the specific requirements and constraints of embedded systems and prevents malicious-code and hostile-actors from exploiting vulnerabilities. Embodiments of the present disclosure can address this need.

Embodiments of the present disclosure can include a security stack for embedded systems that can allow a microcontroller to verify the authenticity of firmware, applications, messages and other data that is sent to it. The security stack can also allow the microcontroller to send data that can later be verified by a third-party.

Some embodiments of the present disclosure can provide a method by which a microcontroller (MCU) verifies an origin of installed firmware and controls whether or not it is subsequently executed. Some embodiments of the present disclosure also allow for an MCU to verify the origin of data received through a communications interface. This verification information can allow for the MCU to decide what action, if any, to take when receiving the data. Similarly, the data that an MCU sends can be assigned for later evaluation by third parties to verify the source and integrity of the data.

The present disclosure is made with consideration to numerous vulnerabilities that could exist during the life-cycle of an embedded system. Some embodiments provide counter-measures to specific vulnerabilities, while others contribute to enhance robustness of the overall security stack.

Embodiments of the present disclosure can provide numerous advantages. For example, embodiments of the present disclosure can restrict the application of firmware upgrades of an MCU. For instance, the application of firmware upgrades of an MCU can be restricted such that they can be exclusively made by the appropriate entity (e.g. owner, manufacturer, supplier, etc.). Some embodiments can also be used to ensure that an MCU will only carry out actions that the valid owner instructs, this enforces a level of control for the correct authority.

Figure 1:
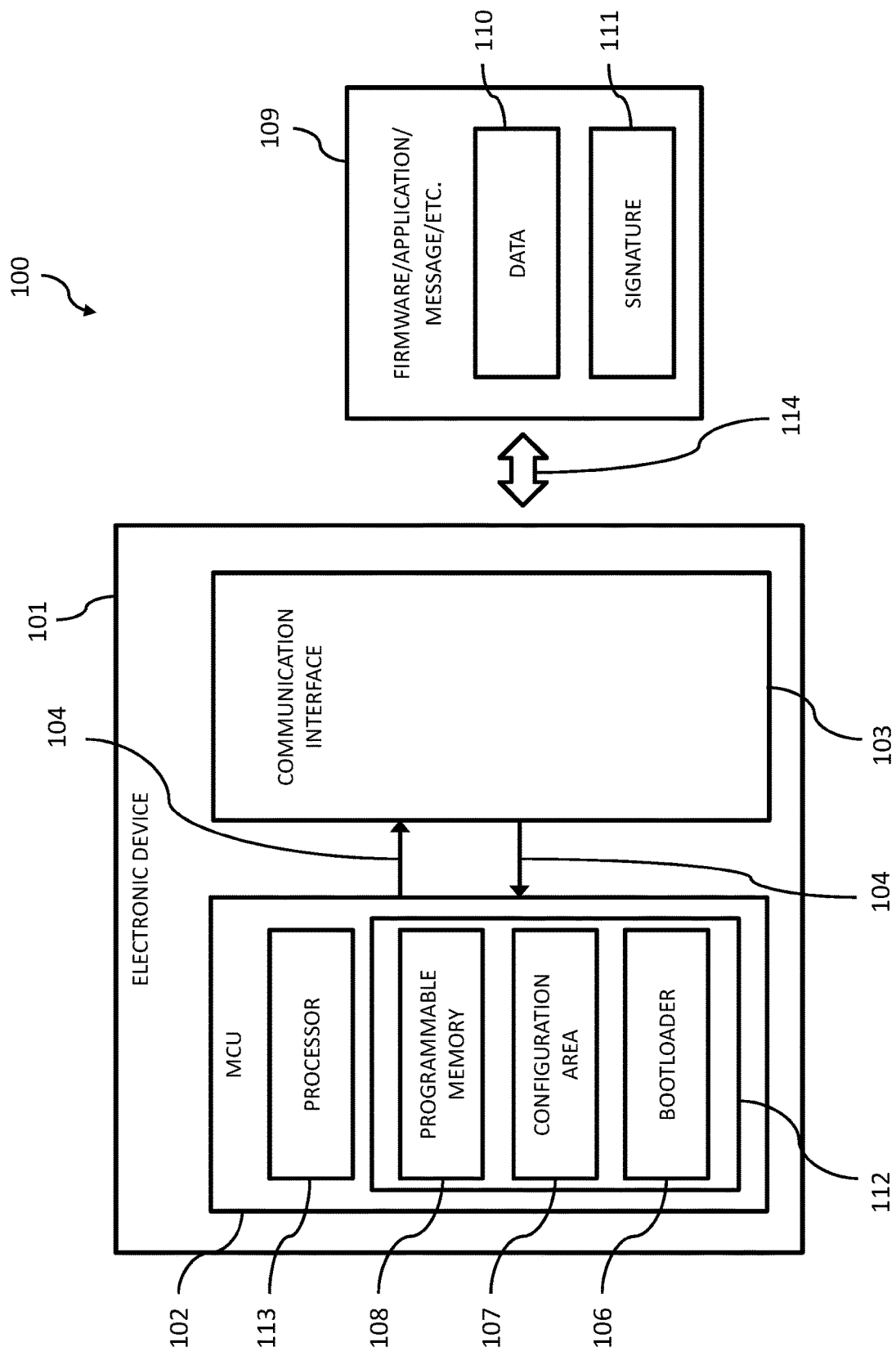
FIG. 1 depicts a system that includes an electronic device equipped with a Microcontroller (MCU) and a communications interface, in accordance with embodiments of the present disclosure.

FIG. 1 depicts a system 100 that can include an electronic device 101 equipped with a microcontroller (MCU) 102 and a communications interface 103, in accordance with embodiments of the present disclosure. The system 100 can use software, hardware, firmware, and/or logic to perform a number of functions described herein. FIG. 1 depicts one possible configuration for an electronic device 101 configured with an MCU 102 and communications interface 103. The MCU 102 can be in communication with the communications interface 103. For example, the MCU 102 can send data through the communications interface 103 via a send communications link 105. In some embodiments, the MCU 102 can receive data through the communications interface 103 via a receive communication link 104. Although the MCU is depicted as having a separate send communication link 105 and receive communication link 104 between the MCU 102 and the communications interface 103, one link can be provided between the MCU 102 and the communications interface 103, which can be configured for sending and receiving data. The one or more links can represent a cable, wireless, fiber optic, or remote connection via a telecommunication link, an infrared link, a radio frequency link, and/or other connectors or systems that provide electronic communication.

Both of these pathways (e.g., send communication link 105, receive communication link 104) may also be encrypted to add a layer of security. The MCU can include a memory resource 112, which can include a bootloader 106 (e.g., computer readable instructions), a configuration area 107, and/or a programmable memory 108. In some embodiments, the memory resource 112 can store computer-readable instructions, that when executed by a processor 113 can perform a particular function. Although the bootloader 106, the configuration area 107, and the programmable memory 108 are depicted as being stored on one memory resource 112, the bootloader 106, the configuration area 107, and the programmable memory 108 can be included on different memories. The MCU 102 can be programmed with a bootloader 106 that can execute (e.g., be executed by the processor 113) in response to the bootloader receiving a prompt. For example, the MCU can be programed with the bootloader 106 that can be executed when the MCU 102 starts and/or restarts.

The MCU 102 can contain an area of memory reserved for configuration data (e.g. device-ID, security keys, certificates, etc.), which is depicted as configuration area 107. Memory protection functions included in modern MCU design can be used to prevent the bootloader 106 and configuration area 107 of the memory resource 112 from being read and/or written. The data stored in the programmable memory 108 can include instructions that are executable by the processor 113, in some embodiments. The executable instructions (e.g. firmware, operating-system, applications, etc.) and/or data written to programmable memory 108 (e.g., non-transitory computer-readable medium (CRM)) can be accompanied by a type of cryptographically secure signature. In an example, the cryptographically secure signature can be generated by the entity that supplies executable instructions and/or data written to programmable memory 108 (e.g. manufacturer, developer, etc.). As alluded to above, the programmable memory 108 can store instructions which are executed by the MCU. For example, the MCU 102 can include the processor 113 (e.g., processor resource) that can execute instructions (e.g., computer readable instructions (CRI)) stored on the programmable memory 108.

When the MCU 102, such as the one depicted in FIG. 1, starts and/or restarts, the bootloader 106 can be executed. The bootloader 106 can perform a verification function that compares security data stored in the configuration area 107 with a signature that accompanies the data stored in the programmable memory 108. The bootloader 106 uses security data stored in configuration area 107 (e.g. cryptographic keys) to verify the contents of the programmable memory 108 against the provided signature (e.g., the cryptographically secure signature that accompanies the executable instructions and/or data written to the programmable memory 108). In some embodiments, if the verification function is successful, then the bootloader 106 proceeds and executes the contents (e.g., contents of the programmable memory 108). For example, in response to the security data stored in the configuration area 107 matching the signature that accompanies the data stored in the programmable memory 108, the data stored in the programmable memory 108 can be executed. This can be considered the normal and desirable course of action (e.g., in an instance where the verification function succeeds).

In some embodiments, if the verification function fails, then the bootloader 106 can go into an error state with suitable logging, such as a data logging function, and/or signaling (e.g. print to serial console, flash LED, etc.), but does not execute any instructions from programmable memory 108. For example, in response to the security data stored in the configuration area 107 not matching the signature that accompanies the data stored in the programmable memory 108, the data stored in the programmable memory 108 can be prevented from being executed. In some embodiments, an error logging error state can include documenting an error. In an example, the error logging error state can document that the security data stored in the configuration area 107 does not match the signature that accompanies the data stored in the programmable memory 108. For instance, the error logging state can include printing to serial console.

In some embodiments an error signaling state can include providing a notification via a user interface that includes an output component such as, a display, vibration generating devices, light (e.g., flash LED, speakers, etc.). For example, the error state can include instructions executable to generate a signal. The executed instructions (e.g. firmware, operating-system, applications, etc.) could make use of a similar verification mechanism to verify subsequently executed instructions (e.g. as a multi-stage bootloader, operating-system, virtual-machine, supervisor, hypervisor, etc.).

When a packet 109 of data 110 (e.g. message) is sent via the send communication link 105 or received via the receive communication link 104 between the MCU 102 and the communications interface 103 and an interface communication link 114, it is accompanied by a signature 111. The signature 111 is calculated by the creator of the message (e.g. an MCU 102, or external entity such as a mobile phone) using cryptographic keys so that its authenticity can be later verified by a recipient as having originated from that entity. For example, an MCU 102 that receives a message that instructs it to reboot will only carry out that action if the message is accompanied by a signature from an entity that has authority to issue that command and/or if the MCU 102 verifies the authenticity of the cryptographic key (e.g., verifies the cryptographic key as having originated from the entity). A list of authorities could be contained in the MCU configuration area 107 or form part of the message itself with appropriate cryptographically secure credentials (e.g. forming part of a certificate chain). In an example, the list of authorities can include signatures and associated entities that have authority to send the data 110.

Figure 2:
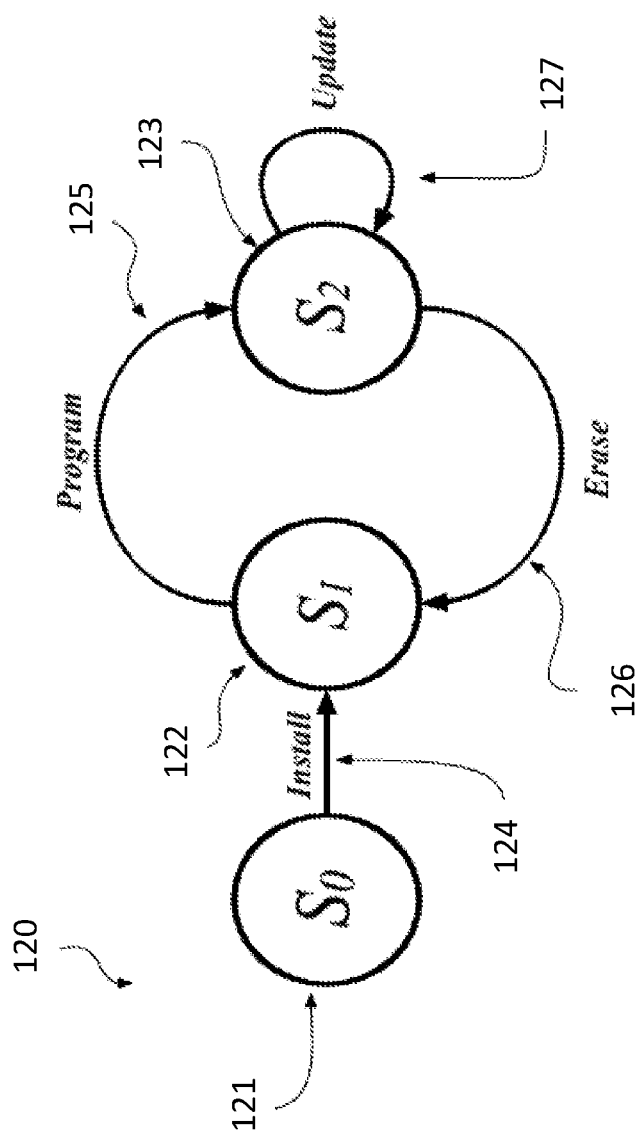
FIG. 2 depicts a life-cycle of an electronic device expressed as a Finite State Machine (FSM), in accordance with embodiments of the present disclosure.

FIG. 2 depicts a life-cycle of an electronic device expressed as a Finite State Machine (FSM), in accordance with embodiments of the present disclosure. In accordance with the embodiments of the present disclosure, FIG. 2 uses a Finite State Machine (FSM) notation to depict the life-cycle 120 of an electronic device, such as the one depicted in FIG. 1. When in initial state $S_0$ 121, a device is considered to be blank and may have no bootloader or configuration. This will typically be the case when the device has been newly manufactured or reset to factory defaults. A process of installation 124 programs the bootloader and configuration information into the device. The device is then said to be commissioned and in commissioned state $S_1$ 122.

By programming 125 the device with executable instructions (e.g. firmware, operating-system, applications, etc.), the device is then said to be operational and in operational state $S_2$ 123. Updates 127 to the executable code or its configuration keep the device in operational state $S_2$ 123 and may take effect immediately, or following a restart. The device can be returned to the commissioned state $S_1$ 122 by erasing 126 the programmable memory so that only the bootloader and configuration remain. To avoid unauthorized reprogramming of a device, the bootloader and configuration can be prevented from ever being erased, thus the life-cycle 120 lacks a valid transition from commissioned state $S_1$ 122 to initial state $S_0$ 121.

Figure 3:
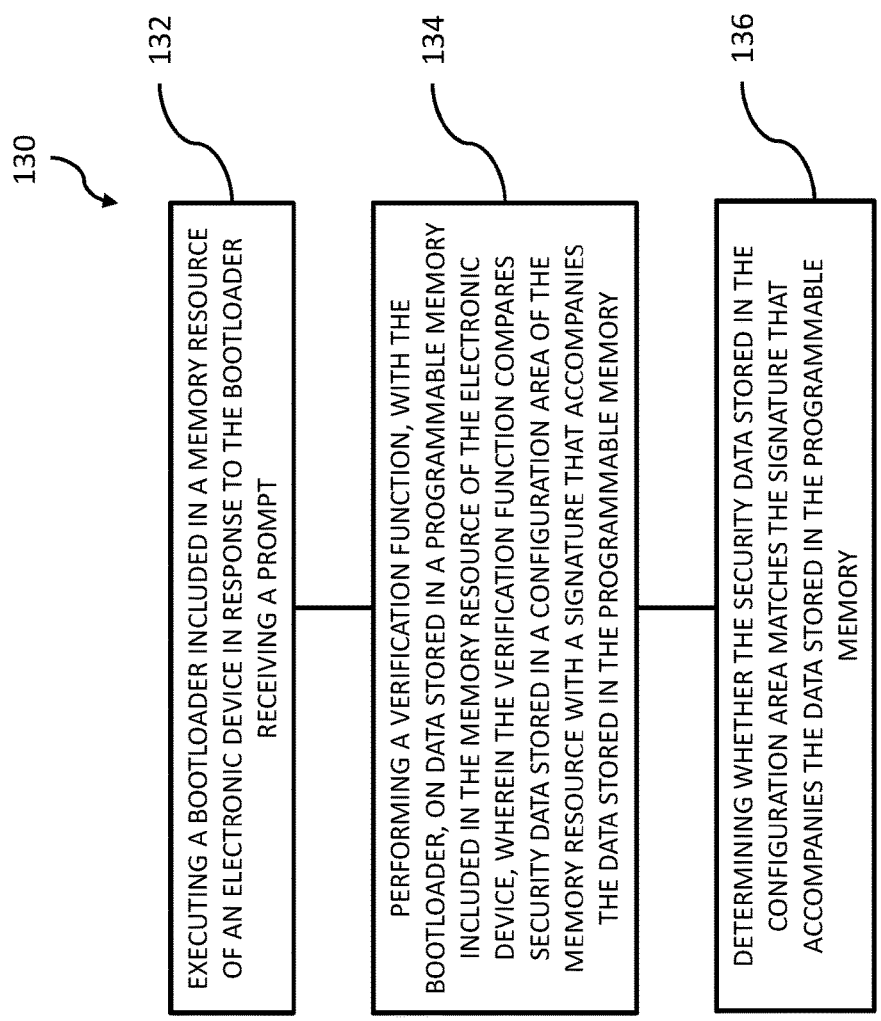
FIG. 3 depicts a method flow diagram for executing a security stack, in accordance with embodiments of the present disclosure.

FIG. 3 depicts a method 130 flow diagram for executing a security stack, in accordance with embodiments of the present disclosure. In some embodiments, the method can include executing a bootloader included in a memory resource of an electronic device in response to the bootloader receiving a prompt, at block 132. In some embodiments, the bootloader can include computer readable instructions. The prompt can be received by the bootloader in response to the electronic device restarting. For example, the processor can execute the instructions included in the bootloader in response to the electronic device performing a starting and/or restarting procedure.

In some embodiments, at block 134, the method can include performing a verification function, with the bootloader, on data stored in a programmable memory included in the memory resource of the electronic device. The verification function can compare security data stored in a configuration area of the memory resource with a signature that accompanies the data stored in the programmable memory, as discussed herein.

In some embodiments, the method can include determining whether the security data stored in the configuration area matches the signature that accompanies the data stored in the programmable memory, at block 136. Based on the determination whether the security data stored in the configuration area matches the signature that accompanies the data stored in the programmable memory, a determination can be made on whether to execute the data stored in the programmable memory. For example, the method can include executing the data stored in the programmable memory in response to the security data stored in the configuration area matching the signature that accompanies the data stored in the programmable memory. In some embodiments, the method can include generating a notification in response to the security data stored in the configuration area not matching the signature that accompanies the data stored in the programmable memory, as discussed herein. For example, the notification can be generated via a user interface that includes an output component such as, a display, vibration generating device, light, etc.

Figure 4:
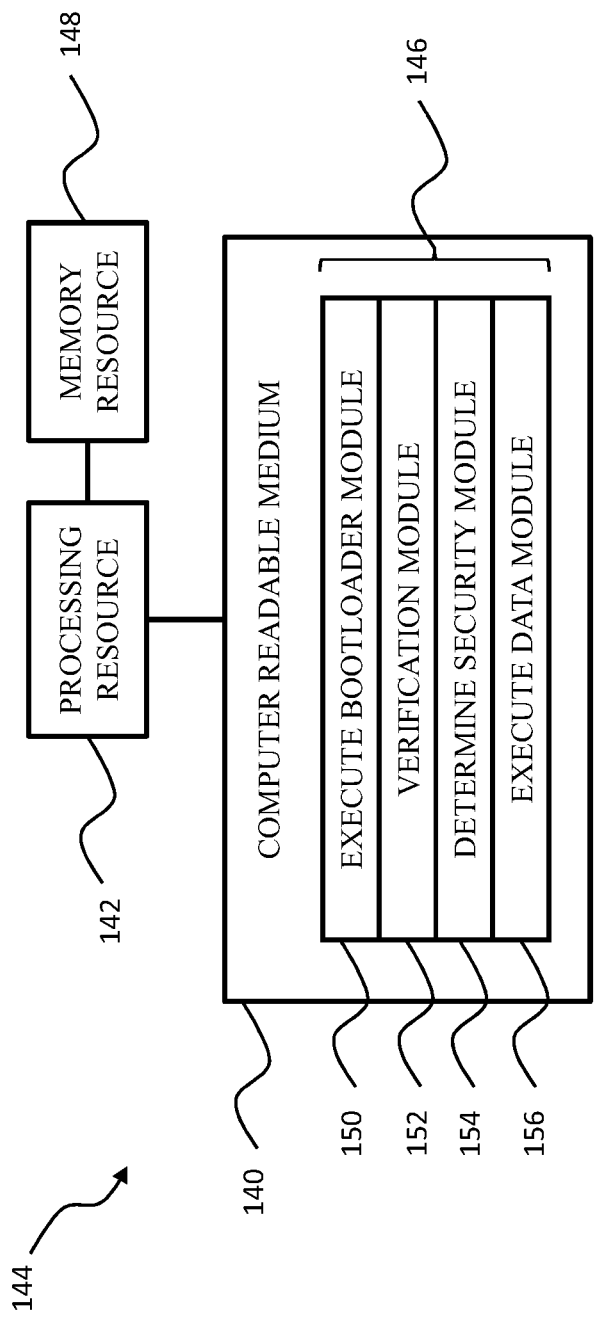
FIG. 4 depicts a block diagram of an example of a computer-readable medium in communication with processing resources of a computing device, in accordance with embodiments of the present disclosure.

FIG. 4 depicts a block diagram of an example of a computer-readable medium 140 in communication with processing resource 142 of a computing device 144, in accordance with embodiments of the present disclosure. The electronic device 101, as discussed in relation to FIG. 1, can utilize software, hardware, firmware, and/or logic to perform a number of functions. The electronic device 101 can include a number of remote computing devices.

The electronic device 101 can be a combination of hardware and program instructions configured to perform a number of functions. The hardware, for example, can include one or more processing resources 142, computer readable medium (CRM) 140, etc. The program instructions (e.g., computer-readable instructions (CRI) 146) can include instructions stored on CRM 140 and executable by the processing resource 142 to implement a desired function (e.g., determine that the security data stored in the configuration area matches the signature that accompanies the data stored in the programmable memory, etc.). The CRI 146 can also be stored in remote memory managed by a server and represent an installation package that can be downloaded, installed, and executed. The electronic device 101 can include memory resources 148, and the processing resource 142 can be coupled to the memory resources 148.

Processing resource 142 can execute CRI 146 that can be stored on an internal or external non-transitory CRM 140. The processing resource 142 can execute CRI 146 to perform various functions, including the functions described with respect to FIG. 1 to FIG. 3.

A number of modules 150, 152, 154, 156 can be sub-modules or other modules. For example, the verification module 152 and the determine security module 154 can be sub-modules and/or contained within a single module. Furthermore, the number of modules 150, 152, 154, 156 can comprise individual modules separate and distinct from one another.

An execute bootloader module 150 can comprise CRI 146 and can be executed by the processing resource 142 to execute a bootloader included in a memory resource of an electronic device in response to the bootloader receiving a prompt. In an example, instructions associated with the bootloader can be executed by the processing resource 142.

A verification module 152 can comprise CRI 146 and can be executed by the processing resource 142 to perform a verification function, with the bootloader, on data stored in a programmable memory included in the memory resource of the electronic device. In some embodiments, the verification function can compare security data stored in a configuration area of the memory resource with a signature that accompanies the data stored in the programmable memory. In some embodiments, the data stored in the programmable memory can be received via a communication interface in communication with the programmable memory. For example, in some embodiments, the data can be received from another electronic device. In an example, the data can be accompanied by a signature that has been created for the data.

A determine security module 154 can comprise CRI 146 and can be executed by the processing resource 142 to determine that the security data stored in the configuration area matches the signature that accompanies the data stored in the programmable memory. An execute data module 156 can comprise CRI and can be executed by the processing resource 142 to execute the data stored in the configuration area in response to the determination. For example, the data stored in the configuration area can be executed in response to a determination that the security data stored in the configuration area matches the signature that accompanies the data stored in the programmable memory.

Embodiments are described herein of various apparatuses, systems and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in this specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments", "some embodiments", "one embodiment", or "an embodiment", or the like, means that a particular feature, structure, or characteristic described in connection with the embodiment(s) is included in at least one embodiment. Thus, appearances of the phrases "in various embodiments", "in some embodiments", "in one embodiment", or "in an embodiment", or the like, in places throughout the specification, are not necessarily all referring to the same embodiment. Furthermore, the particular features, structures or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

What is claimed is:

1. A system comprising:
   an electronic device including a memory resource and processor resource, the memory resource comprising a bootloader, a configuration area, and a programmable memory, wherein the bootloader, configuration area, and programmable memory are stored on the memory resource, the memory resource storing computer-readable instructions, that when executed by the processor resource, cause the processor resource to:
   execute the bootloader, in response to the bootloader receiving a prompt;
   perform a verification function, with the bootloader, on data stored in the programmable memory, wherein the verification function compares security data stored in the configuration area with a signature that accompanies the data stored in the programmable memory.

2. The system of claim 1, further comprising instructions executable to execute the data stored in the programmable memory in response to the security data stored in the configuration area matching the signature that accompanies the data stored in the programmable memory.

3. The system of claim 2, wherein the data stored in the programmable memory comprises instructions executable by the processor.

4. The system of claim 3, wherein the signature that accompanies the data stored in the programmable memory includes a cryptographically secure signature.

5. The system of claim 4, wherein the security data stored in the configuration area includes a cryptographic key.

6. The system of claim 1, further comprising instructions executable to prevent the data stored in the programmable memory from being executed in response to the security data stored in the configuration area not matching the signature that accompanies the data stored in the programmable memory.

7. The system of claim 6, further comprising instructions executable to cause the bootloader to enter an error state.

8. The system of claim 7, wherein the error state includes instructions executable to perform a data logging function.

9. The system of claim 7, wherein the error state includes instructions executable to generate a signal.

10. The system of claim 9, wherein the signal is generated via at least one of a display, a vibration generating device, and a light.

11. The system claim 1, wherein the prompt is received in response to the electronic device starting.

12. A method for executing a security stack comprising:
    executing a bootloader included in a memory resource of an electronic device in response to the bootloader receiving a prompt;
    performing a verification function, with the bootloader, on data stored in a programmable memory included in the memory resource of the electronic device, wherein the verification function includes comparing security data stored in a configuration area of the memory resource with a signature that accompanies the data stored in the programmable memory; and
    determining whether the security data stored in the configuration area matches the signature that accompanies the data stored in the programmable memory.

13. The method of claim 12, further comprising receiving the prompt with the bootloader in response to the electronic device starting.

14. The method of claim 12, further comprising receiving the prompt with the bootloader in response to the electronic device restarting.

15. The method of claim 12, further comprising executing the data stored in the programmable memory in response to the security data stored in the configuration area matching the signature that accompanies the data stored in the programmable memory.

16. The method of claim 12, further comprising generating a notification in response to the security data stored in the configuration area not matching the signature that accompanies the data stored in the programmable memory.

17. A non-transitory computer-readable medium storing instructions to execute a security stack, executable by a processing resource to:
    execute a bootloader included in a memory resource of an electronic device in response to the bootloader receiving a prompt;
    perform a verification function, with the bootloader, on data stored in a programmable memory included in the memory resource of the electronic device, wherein the verification function compares security data stored in a configuration area of the memory resource with a signature that accompanies the data stored in the programmable memory;
    determine that the security data stored in the configuration area matches the signature that accompanies the data stored in the programmable memory; and execute the data stored in the configuration area in response to the determination.

18. The non-transitory computer-readable medium of claim 17, further comprising instructions executable to receive the data stored in the programmable memory via a communication interface in communication with the programmable memory.

19. The non-transitory computer-readable medium of claim 17, wherein the data stored in the programmable memory includes executable instructions.

20. The non-transitory computer-readable medium of claim 17, wherein the signature that accompanies the data stored in the programmable memory is a cryptographically secure signature generated by an entity that supplies the data stored in the programmable memory.

\* \* \* \* \*